United States Patent
Kurihara et al.

(10) Patent No.: US 11,924,368 B2
(45) Date of Patent: Mar. 5, 2024

(54) DATA CORRECTION APPARATUS, DATA CORRECTION METHOD, AND PROGRAM

(71) Applicant: NIPPON TELEGRAPH AND TELEPHONE CORPORATION, Tokyo (JP)

(72) Inventors: Sachiko Kurihara, Tokyo (JP); Noboru Harada, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 324 days.

(21) Appl. No.: 17/608,823

(22) PCT Filed: May 7, 2019

(86) PCT No.: PCT/JP2019/018261
§ 371 (c)(1),
(2) Date: Nov. 4, 2021

(87) PCT Pub. No.: WO2020/225851
PCT Pub. Date: Nov. 12, 2020

(65) Prior Publication Data
US 2022/0279066 A1 Sep. 1, 2022

(51) Int. Cl.
*H04M 1/24* (2006.01)
*G10L 21/0232* (2013.01)
(Continued)

(52) U.S. Cl.
CPC ....... *H04M 3/2236* (2013.01); *G10L 21/0232* (2013.01); *G10L 25/60* (2013.01);
(Continued)

(58) Field of Classification Search
CPC ... H04M 3/2236; H04M 3/26; G10L 21/0232; G10L 25/60; G10L 25/84
See application file for complete search history.

(56) References Cited

U.S. PATENT DOCUMENTS 6,504,905 B1* 1/2003 Tsai ................ H04M 3/533
379/27.04
9,584,946 B1* 2/2017 Lyren ................. H04S 7/30
(Continued)

OTHER PUBLICATIONS

ITU-T (1996) "ITU-T Recommendation P.800: Methods for subjective determination of transmission quality", ITU.
(Continued)

*Primary Examiner* — Simon King

(57) ABSTRACT

To improve accuracy of an evaluation in an acoustic quality evaluation test performed by comparing an evaluation target sound and a reference sound. A data correction apparatus 3 compares, in a call performed between a near-end terminal 1 and a far-end terminal 2, an evaluation target sound in which a voice output from the near-end terminal 1 is recorded and a reference sound in which a voice spoken by a call partner using the far-end terminal 2 to correct test data used in a listening test for evaluating acoustic quality of the call. A correction target determination unit 31 determines, as a correction target section, a voiced section that does not include the voice of the call partner detected from an acoustic signal representing the reference sound. A correction execution unit 32 updates the correction target section of the acoustic signal representing the reference sound with a non-voice signal predetermined.

7 Claims, 3 Drawing Sheets

(51) Int. Cl.
*G10L 25/60* (2013.01)
*G10L 25/84* (2013.01)
*H04M 3/08* (2006.01)
*H04M 3/22* (2006.01)
*H04M 3/26* (2006.01)
*G10L 21/0208* (2013.01)

(52) U.S. Cl.
CPC .............. *G10L 25/84* (2013.01); *H04M 3/26* (2013.01); *G10L 2021/02082* (2013.01)

(56) References Cited

U.S. PATENT DOCUMENTS

| | | | |
|---|---|---|---|
| 9,924,404 B1* | 3/2018 | Salour | H04L 65/80 |
| 2012/0253805 A1* | 10/2012 | Rajakumar | G10L 17/26 |
| | | | 704/E15.001 |
| 2019/0304470 A1* | 10/2019 | Ghaemmaghami | G10L 17/04 |
| 2019/0355377 A1* | 11/2019 | Fox | G10L 21/0264 |

OTHER PUBLICATIONS

ITU-T (2001) "ITU-T Recommendation P.862: Perceptual evaluation of speech quality (PESQ): An objective method for end-to-end speech quality assessment of narrow-band telephone networks and speech codecs", ITU.

Kurihara et al. (2018) "Quality of experience assessment in hands-free communications: Study on subjective evaluation method consistent with PESQ measure", IEICE technical report, vol. 117, No. 386, CQ2017-96, pp. 63-68, Jan. 2018 with English translation generated by computer.

\* cited by examiner

DATA CORRECTION APPARATUS, DATA CORRECTION METHOD, AND PROGRAM

CROSS-REFERENCE TO RELATED APPLICATIONS

This application is a U.S. 371 Application of International Patent Application No. PCT/JP2019/018261, filed on 7 May 2019, the disclosure of which is hereby incorporated herein by reference in its entirety.

TECHNICAL FIELD

The present disclosure relates to techniques for evaluating transmission quality, and particularly to quality evaluation testing techniques for loudspeaker hands-free communication systems.

BACKGROUND ART

With the development of communication technologies, there is an increase in the opportunity to use a loudspeaker hands-free communication system, such as a hands-free call by a conferencing system, a smartphone, and the like, because of the ease with which the call can be made without holding a device. The acoustic echo canceller (AEC) has been used to remove acoustic echoes and ambient noises that act as problems in the loudspeaker hands-free communication system and to provide a comfortable call environment.

Acoustic echoes refer to phenomena in which a voice transmitted from the near end is output from a speaker at a far end and a microphone at the far end picks up the voice. When the effects of the acoustic echo canceller are weak, the acoustic echoes remain uncancelled. When the effects of the acoustic echo canceller are too strong, even the transmitted voice from the far end is removed, and thus the voice is distorted or eliminated and is less likely to be heard. Since the performance of the acoustic echo canceller depends on how precisely the acoustic echo has been removed, the performance evaluation of the acoustic echo canceller in the related art is mainly the objective evaluation focusing on the amount of acoustic echo eliminated. The objective evaluation is easy because the evaluation can be performed by computer processing. However, there has been a problem in that the objective evaluation does not always match the quality experienced by the user (also referred to as "quality of experience") in actual phone calls.

In order to evaluate acoustic echoes or sound processed by the acoustic echo canceller in subjective evaluation, it is necessary to perceive the acoustic echoes, and the evaluation is possible only when an evaluator himself or herself makes a phone call. Thus, in a loudspeaker hands-free communication system, such as hands-free calls and the like, quality evaluation by two-way conversational test has been recommended (see Non Patent Literature 1). However, there are problems in that the conduct of the conversational test requires a know-how and takes time and cost, and reproducibility is low.

In an IP phone that uses a handset to make calls, the voice transmitted from the far end does not receive an influence of a near-end talker, such as acoustic echoes, and only the voice transmitted from the far end can be evaluated. Thus, it is common for quality evaluation of the IP phone to be performed by a listening test in which the conversational test is simplified and one-way voice is set as the target. The listening test has higher reproducibility and a short conduction time than the conversational test. Thus, the listening test is highly convenient. In addition, objective evaluation methods such as perceptual evaluation of speech quality (PESQ) that estimates the subjective evaluation value by the listening test (also referred to as "listening mean opinion score (listening MOS)") have also been established (see Non Patent Literature 2). In recent years, a method of applying the subjective evaluation by the listening test, the objective evaluation such as PESQ, and the like to the loudspeaker hands-free communication system has also been proposed (see Non Patent Literature 3).

In the listening test, acoustic quality is evaluated in a manner that an evaluator listens and compares an acoustic signal in which a voice (also referred to as "an evaluation target sound" below) obtained by a voice spoken by a far-end talker being reproduced on a near-end talker end is recorded, and an acoustic signal in which the voice (also referred to as "a reference sound" below) spoken by the far-end talker is directly recorded. In the PESQ, quality factors, for example, voice coding strain, time structure distortion due to variation in delay, and packet/cell loss distortion, are physically measured from each of the acoustic signal representing the evaluation target sound and the acoustic signal representing the reference sound, and the listening MOS is estimated from the result.

CITATION LIST

Non Patent Literature

Non Patent Literature 1: ITU-T, "ITU-T Recommendation P.800: Methods for subjective determination of transmission quality", ITU, 1996

Non Patent Literature 2: ITU-T, "ITU-T Recommendation P.862: Perceptual evaluation of speech quality (PESQ): An objective method for end-to-end speech quality assessment of narrow-band telephone networks and speech codecs", ITU, 2001

Non Patent Literature 3: Sachiko Kurihara, Suehiro Shimauchi, Masahiro Fukui, Noboru Harada, "Quality of experience assessment in hands-free communications: Study on subjective evaluation method consistent with PESQ measure", IEICE technical report, vol. 117. no. 386. CQ2017-96. pp.63-68. January 2018

SUMMARY OF THE INVENTION

Technical Problem

However, in a case where an acoustic quality evaluation test of comparing the evaluation target sound and the reference sound is performed on the loudspeaker hands-free communication system, the wraparound of the near-end talker's voice, which is output from a speaker, may be recorded in a state of being superimposed on the reference sound when the reference sound is recorded on the far-end talker end. In addition, the ambient noise on the far-end talker end may be recorded in a state of being superimposed on the reference sound. The unnecessary acoustic signal which is not based on a voice signal of the far-end talker, such as the wraparound of the near-end talker's voice or the ambient noise is also referred to as an interference sound. As described above, entering of the interference sound into the reference sound prevents accurate evaluation of the evaluation target sound. In particular, when the acoustic echo canceller is used, acoustic echoes (that is, wraparound of the near-end talker's voice) have been removed from the evaluation target sound, but have been entered into the reference sound. Thus, there is a concern that the evaluation is lower than it should be.

In view of the technical problems described above, an object of the present disclosure is to improve the accuracy of the evaluation in an acoustic quality evaluation test performed by comparing an evaluation target sound and a reference sound.

Means for Solving the Problem

To solve the above problem, according to an aspect of the present disclosure, there is provided a data correction apparatus configured to compare, in a call performed between a plurality of communication terminals, an evaluation target sound in which a voice output from a first communication terminal of the plurality of communication terminals is recorded and a reference sound in which a voice spoken by a call partner using a second communication terminal of the plurality of communication terminals is recorded to correct test data used in evaluation of acoustic quality of the call. The data correction apparatus includes a correction target determination unit configured to determine, as a correction target section, a voiced section that does not include the voice of the call partner detected from an acoustic signal representing the reference sound, and a correction execution unit configured to update the correction target section of the acoustic signal representing the reference sound with a non-voice signal predetermined.

Effects of the Invention

According to the data correction technique of the present disclosure, in an acoustic quality evaluation test performed by comparing an evaluation target sound and a reference sound, an interference sound superimposed on the reference sound is removed, and thus it is possible to improve the accuracy of the evaluation.

DESCRIPTION OF EMBODIMENTS

Figure 1:
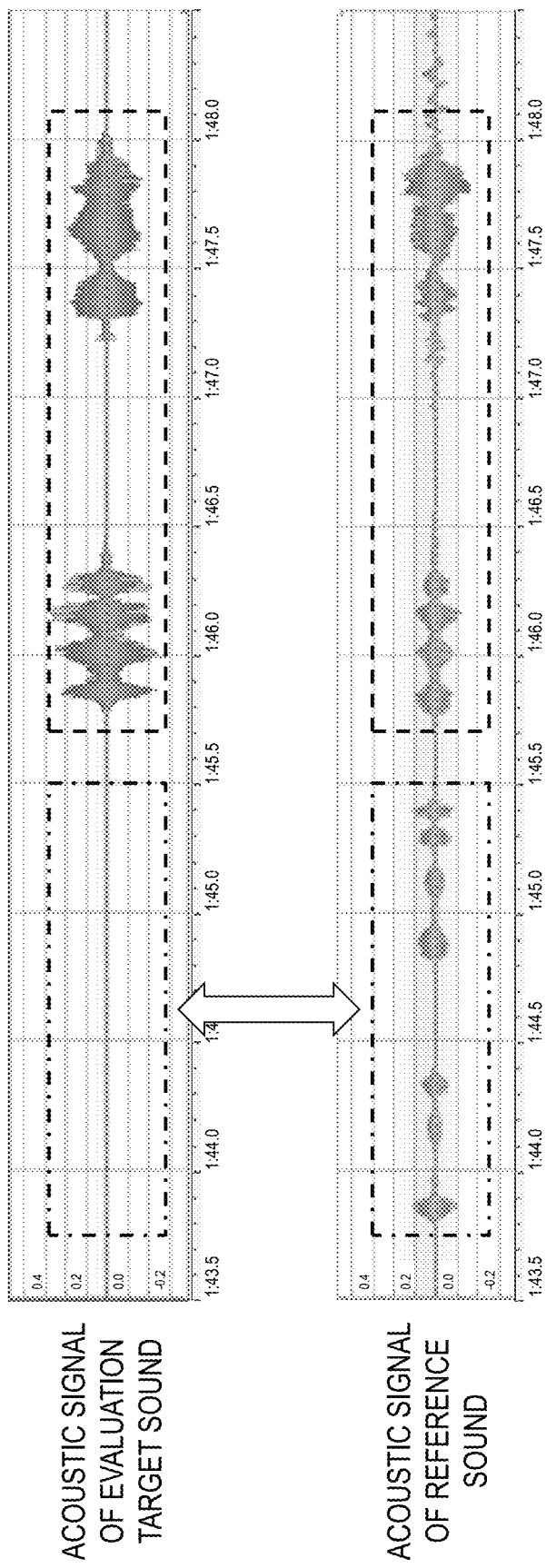
FIG. 1 is a diagram illustrating a specific example of an evaluation target sound and a reference sound.

Hereinafter, an embodiment of the present disclosure will be described in detail. In the drawings, the same reference numerals are given to constituent units that have the same functions and the repeated description will be omitted.

<Acoustic Quality Evaluation Test in Loudspeaker Hands-Free Communication System>

First, an acoustic quality evaluation test by a listening test in a loudspeaker hands-free communication system will be conceptually described. In the acoustic quality evaluation test, a near-end talker and a far-end talker make a conversation through the loudspeaker hands-free communication system, and an evaluator located on the near-end talker end performs quality evaluation of the loudspeaker hands-free communication system. The loudspeaker hands-free communication system refers to a communication system in which acoustic signals are transmitted and received between terminal devices including a microphone and a speaker and refers to a communication system in which at least a portion of a sound output from the speaker of the terminal device is received by the microphone of the terminal device (system in which sound wraparound occurs). An example of the loudspeaker hands-free communication system is a voice conference system and a video conference system.

In the loudspeaker hands-free communication system, the voice of the near-end talker is received by a microphone on the near-end talker end. An acoustic signal obtained based on the received voice is transmitted to the far-end talker end via a network. A sound represented by the transmitted acoustic signal is output from a speaker on the far-end talker end. In addition, a sound on the far-end talker end is received by a microphone on the far-end talker end. An acoustic signal obtained based on the received sound is transmitted to the near-end talker end via the network. A sound represented by the transmitted acoustic signal is output from a speaker on the near-end talker end. At least a portion of the sound output from the speaker on the far-end talker end is also received by the microphone on the far-end talker end. That is, the sound on the far-end talker end received by the microphone on the far-end talker end is a sound in which wraparound (acoustic echo) of the near-end talker's voice is superimposed on the voice of the far-end talker. That is, the sound on the far-end talker end received by the microphone on the far-end talker end is obtained based on a signal in which a signal based on the voice of the near-end talker is degraded in a space on the far-end talker end and is superimposed on a signal based on the sound of the far-end talker. When the near-end talker is not speaking, the signal based on the voice of the near-end talker is not superimposed, and thus the voice on the far-end talker is not degraded. In addition, the sound on the far-end talker end may be degraded by superimposition of ambient noise on the far-end talker end.

The acoustic signal transmitted to the near-end talker end may be derived from a processing signal obtained by performing predetermined signal processing on a signal representing a sound received by the microphone on the far-end talker end, or may be obtained without performing such signal processing. As the signal processing, any processing may be performed. An example of the signal processing includes processing including at least one of echo cancellation processing or noise cancellation processing. The echo cancellation processing refers to processing by a broad-sense echo canceller for reducing echoes. The processing by the broad-sense echo canceller means the overall processing for reducing echoes. The processing by the broad-sense echo canceller may be implemented, for example, only by a narrow-sense echo canceller using an adaptive filter, may be implemented by a voice switch, may be implemented by echo reduction, may be implemented by a combination of at least some of the above techniques, or may be implemented by a combination of at least some of the above techniques and other techniques (see Reference 1 below). Additionally, the noise cancellation processing refers to processing of suppressing or removing noise components generated around the microphone of the far-end terminal and caused by any environmental noise other than the voice of the far-end talker. The environmental noise refers to, for example, the sound of air conditioning in an office, the interior sound while a car running, the sound of a car passing at an intersection, the sound of insects, the touch sound of a keyboard, and the voices of a plurality of people (babble sound). It does not matter whether the sound is loud or faint, or whether the sound is from indoor or from outdoor (see Reference 2 below).

[Reference 1] Knowledge Base, Group 2-Part 6-Chapter 5, "Acoustic Echo Canceller", The Institute of Electronics, Information and Communication Engineers

[Reference 2] Sumitaka Sakauchi, Yoichi Haneda, Masashi Tanaka, Junko Sasaki, Akitoshi Kataoka, "An Acoustic Echo Canceller with Noise and Echo Reduction", The Transactions of the Institute of Electronics, Information and Communication Engineers, Vol. J87-A, No. 4, pp. 448-457, April 2004

An evaluator performs subjective evaluation (opinion evaluation) of transmission quality by alternately listening and comparing an acoustic signal representing a sound (that is, reference sound) output from the speaker on the near-end talker end assuming that sound wraparound on the far-end talker end does not occur, and an acoustic signal representing a sound (that is, evaluation target sound) output from the speaker on the near-end talker end when the sound wraparound occurs on the far-end talker end, using a binaural sound reproduction device such as headphones or earphones.

In the objective evaluation by PESQ, a set of the acoustic signal representing the reference sound and the acoustic signal representing the evaluation target sound, which are acquired as described above, is used as an input, and a PESQ value is calculated by the calculation method disclosed in Non Patent Literature 2, for example. The "original signal X(t)" disclosed in Non Patent Literature 2 corresponds to the acoustic signal representing the reference sound. The "degraded signal Y(t)" disclosed in Non Patent Literature 2 corresponds to the acoustic signal representing the evaluation target sound.

FIG. 1 illustrates a specific example of the acoustic signal representing the evaluation target sound and the acoustic signal representing the reference sound. In this example, a conversation is made by the near-end talker and the far-end talker speaking to each other. The near-end talker speaks in the first half section (portion surrounded by a one-dot chain line) of the acoustic signal. The far-end talker speaks in the second half section (portion surrounded by a broken line). The acoustic signal representing the evaluation target sound is subjected to the echo cancellation processing on the far-end terminal end, and then is transmitted to the near-end terminal. The acoustic signal representing the reference sound is directly recorded from the microphone of the far-end terminal. In the first half section in which the near-end talker is speaking, the voice of the near-end talker is superimposed on the reference sound. However, regarding the evaluation target sound, the wraparound of the near-end talker's voice is removed by the function of the acoustic echo canceller. In the second half section in which the far-end talker is speaking, both acoustic signals represent the voice of the far-end talker. Because the difference from the evaluation target sound is large in the first half section in which the voice of the near-end talker is superimposed on the reference sound, there is a concern that an appropriate evaluation may not be obtained in the acoustic quality evaluation test of comparing the evaluation target sound and the reference sound. As described above, it is conceived that it is possible to improve the accuracy of the acoustic quality evaluation test by replacing the acoustic signal in the section in which the voice of the near-end talker is superimposed on the reference sound, with an acoustic signal in a non-voice section in which no one is speaking.

<Test Data Generation System>

The test data generation system in the embodiments is an information communication system that generates test data used in the acoustic quality evaluation test described above.

Figure 2:
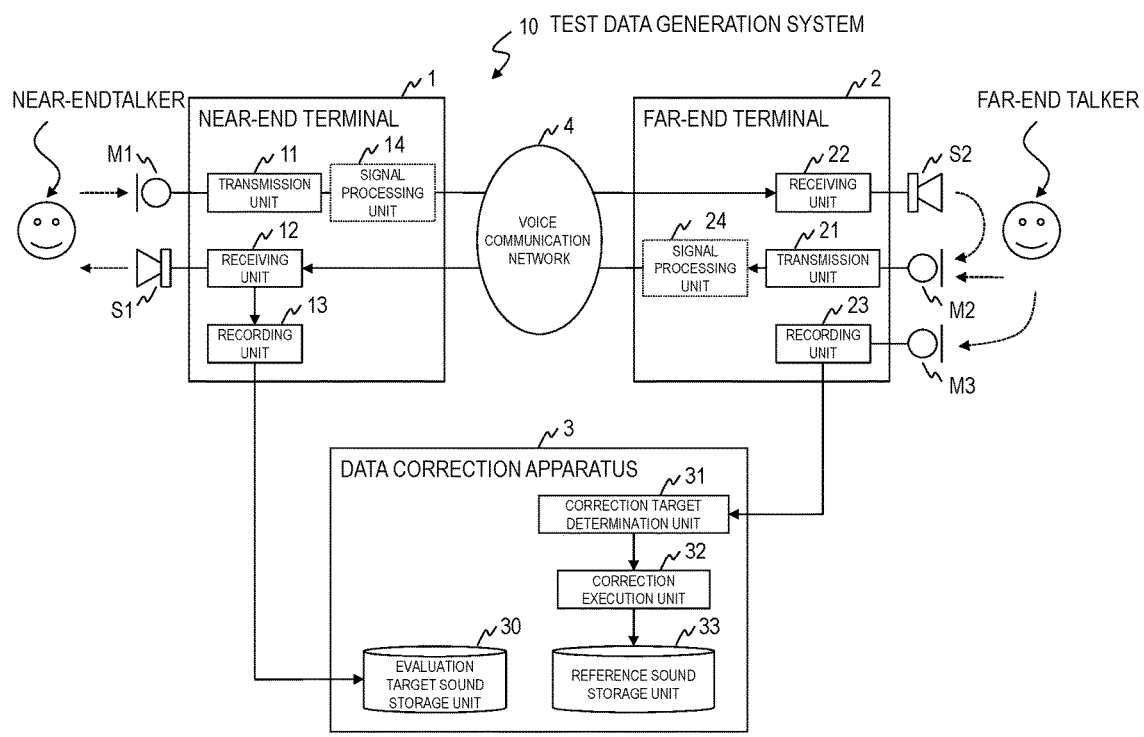
FIG. 2 is a diagram illustrating a functional configuration of a test data generation system.
Figure 3:
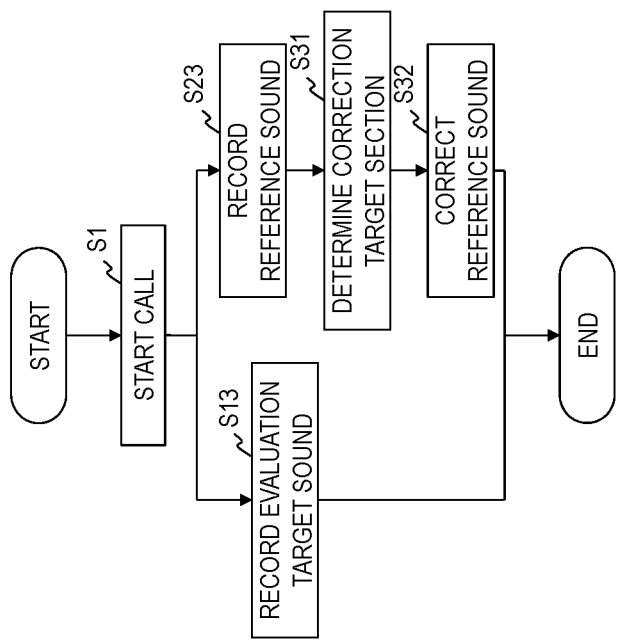
FIG. 3 is a diagram illustrating a processing procedure of a test data generation method.

As illustrated in FIG. 2, the test data generation system 10 in the embodiment includes a near-end terminal 1 used by the near-end talker, a far-end terminal 2 used by the far-end talker, and a data correction apparatus 3. The near-end terminal 1 includes at least a transmission unit 11, a receiving unit 12, and a recording unit 13, and may further include a signal processing unit 14. The far-end terminal 2 includes at least a transmission unit 21, a receiving unit 22, and a recording unit 23, and may further include a signal processing unit 24. The data correction apparatus 3 includes an evaluation target sound storage unit 30, a correction target determination unit 31, a correction execution unit 32, and a reference sound storage unit 33. The test data generation method in the embodiment is implemented by the test data generation system 10 performing the processing of each step illustrated in FIG. 3.

The near-end terminal 1 and the far-end terminal 2 are connected via a voice communication network 4. The data correction apparatus 3 is connected to the near-end terminal 1 and the far-end terminal 2 via a network (not illustrated). However, in a case where the voice communication network 4 is capable of logically dividing a communication path for voice and a communication path for data by band control or the like, the near-end terminal 1 and the far-end terminal 2 may be connected to the data correction apparatus 3 via the voice communication network 4. The voice communication network 4 is a circuit-switched or packet-switched communication network configured so that the connected devices can communicate with each other, and is configured assuming voice communication in particular. Specifically, the voice communication network 4 may be configured by the Internet, a wide area network (WAN), a local area network (LAN), a dedicated line, a public switched telephone network, a mobile telephone communication network, and the like.

Each of the near-end terminal 1 and the far-end terminal 2 is, for example, a special device configured by loading a special program into a known or dedicated computer including a central processing unit (CPU), a main storage device (random access memory (RAM)), and the like. Each of the near-end terminal 1 and the far-end terminal 2 executes, for example, each processing operation under the control of the central processing unit. Data input to the near-end terminal 1 and the far-end terminal 2 and data obtained in each processing operation are stored, for example, in the main storage device, and the data stored in the main storage device is read out to the central processing unit as needed and used for other processing. At least a portion of the near-end terminal 1 and the far-end terminal 2 may be configured with hardware such as an integrated circuit. Specifically, the near-end terminal 1 and the far-end terminal 2 are mobile terminals such as smartphones and tablets, or information processing devices that include a voice transmission and reception function and a data communication function, such as desktops or laptop personal computers.

For example, the data correction apparatus 3 is a special device configured by loading a special program into a known or dedicated computer including a central processing unit (CPU), a main storage device (random access memory (RAM)), and the like. For example, the data correction apparatus 3 executes each processing operation under the control of the central processing unit. Data input to the data correction apparatus 3 and data obtained in each processing operation are stored, for example, in the main storage device, and the data stored in the main storage device is read out to the central processing unit as needed and used for other processing. At least a portion of the data correction apparatus 3 may be configured with hardware such as an integrated circuit. Each storage unit included in the data correction apparatus 3 can be configured by, for example, a main storage device such as a random access memory (RAM), an auxiliary storage device configured by a hard disk, an optical disc, or a semiconductor memory element such as a flash memory, or a middleware such as a relational database or a key-value store. Specifically, the data correction apparatus 3 is an information processing device that includes a data communication function and a data processing function, such as a desktop type or a rack-mounted type server computer.

In Step S1, the near-end terminal 1 and the far-end terminal 2 start a call for acquiring an acoustic signal as an evaluation target for acoustic quality. First, the near-end terminal 1 makes a call to the far-end terminal 2 in accordance with the operation of the near-end talker. The far-end terminal 2 responds to an incoming call from the near-end terminal 1 in accordance with the operation of the far-end talker. Thus, the call is established between the near-end terminal 1 and the far-end terminal 2. Here, an example in which the call is made from the near-end terminal 1 to the far-end terminal 2 is described, but a call may be established by being made from the far-end terminal 2 to the near-end terminal 1.

When the call is established, the voice spoken by the near-end talker is converted to an acoustic signal by a microphone M1 of the near-end terminal 1. The transmission unit 11 transmits the acoustic signal to the receiving unit 22 of the far-end terminal 2. The receiving unit 22 of the far-end terminal 2 outputs the acoustic signal received from the transmission unit 11 of the near-end terminal 1, from a speaker S2 of the far-end terminal 2. The voice spoken by the far-end talker is converted to an acoustic signal by a microphone M2 of the far-end terminal 2. At this time, the wraparound of the near-end talker's voice, which is output from the speaker S2 of the far-end terminal 2, is superimposed on the voice of the far-end talker and then is converted to an acoustic signal. The transmission unit 21 of the far-end terminal 2 transmits the acoustic signal to the receiving unit 12 of the near-end terminal 1. The signal processing unit 24 of the far-end terminal 2 performs signal processing including at least one of echo cancellation processing or noise cancellation processing, on the acoustic signal transmitted to the near-end terminal 1. The receiving unit 12 of the near-end terminal 1 outputs the acoustic signal received from the transmission unit 21 of the far-end terminal 2, from a speaker S1 of the near-end terminal 1. In this manner, the near-end talker and the far-end talker make a conversation via the call established between the near-end terminal 1 and the far-end terminal 2.

In Step S13, the recording unit 13 of the near-end terminal 1 records the acoustic signal output from the speaker S1 by the receiving unit 12 of the near-end terminal 1, and transmits the recorded acoustic signal as an acoustic signal representing the evaluation target sound, to the data correction apparatus 3. The data correction apparatus 3 stores the acoustic signal that is received from the recording unit 13 of the near-end terminal 1 and represents the evaluation target sound, in the evaluation target sound storage unit 30.

In Step S23, the recording unit 23 of the far-end terminal 2 converts the sound input to a microphone M3 of the far-end terminal 2 to an acoustic signal, and transmits the resultant of the conversion as an acoustic signal representing the reference sound, to the data correction apparatus 3. In the data correction apparatus 3, the acoustic signal that is received from the recording unit 23 of the far-end terminal 2 and represents the reference sound is input to the correction target determination unit 31.

The near-end terminal 1 may include the recording unit 23. In this case, the microphone M3 is disposed in a space in which the far-end terminal 2 is present. The microphone M3 and the recording unit 23 of the near-end terminal 1 are connected to each other using an audio cable laid from the microphone M3 to the space in which the near-end terminal 1 is present. Thus, it is possible to directly record the voice spoken by the far-end talker, with the recording unit 23 of the near-end terminal 1.

In Step S31, the correction target determination unit 31 of the data correction apparatus 3 detects voiced sections from the input acoustic signal representing the reference sound, and determines a section in which the voice of the far-end talker is not included from among the voiced sections, as a correction target section. As a method for detecting the voiced sections from the acoustic signal, known voiced/unvoiced sound determination techniques can be used. Whether the voice of the far-end talker is included among the voiced sections can be determined using a known talker identification technique. For example, the frequency of the voice of the far-end talker can be analyzed in advance and the above determination can be performed by determining whether the frequency component is included in each of the voiced sections. The correction target determination unit 31 outputs information (for example, start time and end time, or frame number) representing the correction target section to the correction execution unit 32.

In Step S32, the correction execution unit 32 of the data correction apparatus 3 receives the information representing the correction target section from the correction target determination unit 31, and performs an update by overwriting the correction target section of the acoustic signal representing the reference sound with the predetermined non-voice signal. As the predetermined non-voice signal, an acoustic signal (referred to as a "unvoiced acoustic signal" below) recorded in a state in which the far-end talker is not speaking (that is, unvoiced state) in the space in which the far-end terminal 2 is present. A plurality of unvoiced acoustic signals having different lengths may be prepared in advance. The non-voice signal may be generated by selecting the unvoiced acoustic signal having an appropriate length, combining a plurality of unvoiced acoustic signals, and the like in accordance with the length of the correction target section. When it is difficult to obtain a unvoiced acoustic signal in the space in which the far-end terminal 2 is present, white noise may be used as the non-voice signal. The white noise can be mechanically generated so that a non-voice signal having a length equal to the length of the correction target section can be obtained. The white noise does not include environmental noise in the space in which the far-end terminal 2 is present. Thus, there is a possibility of giving a feeling of discomfort to the evaluator. The correction execution unit 32 stores the acoustic signal representing the corrected reference sound, in the reference sound storage unit 33.

The set of the acoustic signal that is stored in the evaluation target sound storage unit 30 and represents the evaluation target sound and the acoustic signal that is stored in the reference sound storage unit 33 and represents the corrected reference sound is used as test data of the acoustic quality evaluation test. For example, when the subjective evaluation by the listening test is performed, the evaluator alternately listens and compares the evaluation target sound and the corrected reference sound, and determines a subjective evaluation value in accordance with the evaluation category disclosed in Non Patent Literature 1, for example. In addition, for example, when the objective evaluation by PESQ is performed, a set of the acoustic signal representing the evaluation target sound and the acoustic signal representing the corrected reference sound is input, and a PESQ value disclosed in, for example, Non Patent Literature 2 is calculated.

Although the embodiments of the present disclosure have been described, a specific configuration is not limited to the embodiment, and appropriate changes in the design are, of course, included in the present disclosure within the scope of the present disclosure without departing from the gist of the present disclosure. The various steps of the processing described in the embodiments are not only executed sequentially in the described order, but may also be executed in parallel or separately as necessary or in accordance with a processing capability of the device that performs the processing.

[Program and Recording Medium]

When various processing functions in each device described in the foregoing embodiment are implemented by a computer, processing details of the functions that each device should have are described by a program. When the program is executed by a computer, the various processing functions of each device are implemented on the computer.

The program in which the processing details are described can be recorded on a computer-readable recording medium. The computer-readable recording medium can be any type of medium such as a magnetic recording device, an optical disc, a magneto-optical recording medium, and a semiconductor memory.

The program is distributed, for example, by selling, giving, or lending a portable recording medium such as a DVD or a CD-ROM with the program recorded on it. Further, the program may be stored in a storage device of a server computer and the program may be distributed by transferring the program from the server computer to another computer via a network.

For example, a computer executing such a program first stores the program recorded on the portable recording medium or the program transferred from the server computer, once in its own storage device. When processing is executed, the computer reads the program stored in its own storage device and executes the processing in accordance with the read program. As another execution form of the program, the computer may directly read the program from the portable recording medium and execute processing in accordance with the program. Further, each time the program is transferred from the server computer to the computer, the computer executes processing sequentially in accordance with the received program. In another configuration, the processing may be executed through a so-called application service provider (ASP) service in which functions of the processing are implemented just by issuing an instruction to execute the program and obtaining results without transfer of the program from the server computer to the computer. In addition, the program in the present embodiment is assumed to include information which is provided for processing by a computer and is equivalent to a program (data and the like that has characteristics regulating processing of the computer rather than a direct instruction for a computer).

Also, in the present embodiment, the device is configured by executing a predetermined program on a computer. However, at least a part of the processing contents may be implemented by hardware.

REFERENCE SIGNS LIST

10 Test data generation system
1 Near-end terminal
2 Far-end terminal
3 Data correction apparatus
4 Voice communication network
11, 21 Transmission unit
12, 22 Receiving unit
13, 23 Recording unit
14, 24 Signal processing unit
30 Reference sound storage unit
31 Correction target determination unit
32 Correction execution unit
33 Evaluation target sound storage unit

The invention claimed is:

1. A data correction apparatus configured to compare, in a call performed between a plurality of communication terminals, an evaluation target sound in which a voice output from a first communication terminal of the plurality of communication terminals is recorded and a reference sound in which a voice spoken by a call partner using a second communication terminal of the plurality of communication terminals is recorded to correct test data used in evaluation of acoustic quality of the call, the apparatus comprising:
processing circuitry configured to: execute
a correction target determination processing configured to determine, as a correction target section, a voiced section that does not include the voice of the call partner detected from an acoustic signal representing the reference sound; and
a correction execution processing configured to update the correction target section of the acoustic signal representing the reference sound with a non-voice signal predetermined.

2. The data correction apparatus according to claim 1, wherein
the non-voice signal is an acoustic signal recorded in a state in which the call partner is not speaking in a space in which the second communication terminal is present.

3. A non-transitory computer-readable storage medium which stores a program for causing a computer to operate as the data correction apparatus according to claim 2.

4. The data correction apparatus according to claim 1, wherein
the non-voice signal is white noise.

5. A non-transitory computer-readable storage medium which stores a program for causing a computer to operate as the data correction apparatus according to claim 4.

6. A non-transitory computer-readable storage medium which stores a program for causing a computer to operate as the data correction apparatus according to claim 1.

7. A data correction method that compares, in a call performed between a plurality of communication terminals, an evaluation target sound in which a voice output from a first communication terminal of the plurality of communication terminals is recorded and a reference sound in which a voice spoken by a call partner using a second communication terminal of the plurality of communication terminals is recorded to correct test data used in evaluation of acoustic quality of the call, the method comprising:
determining, by a correction target determination processing, as a correction target section, a voiced section that does not include the voice of the call partner detected from an acoustic signal representing the reference sound; and updating, by a correction execution processing, the correction target section of the acoustic signal representing the reference sound with a non-voice signal predetermined.

\* \* \* \* \*